US012368199B2

(12) United States Patent
Shimizu et al.

(10) Patent No.: US 12,368,199 B2
(45) Date of Patent: Jul. 22, 2025

(54) POWER STORAGE DEVICE

(71) Applicant: Panasonic Intellectual Property Management Co., Ltd., Osaka (JP)

(72) Inventors: Kazumichi Shimizu, Osaka (JP); Kazutoshi Kohira, Hyogo (JP); Shinya Geshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 518 days.

(21) Appl. No.: 17/760,110

(22) PCT Filed: Feb. 19, 2021

(86) PCT No.: PCT/JP2021/006494
§ 371 (c)(1),
(2) Date: Aug. 4, 2022

(87) PCT Pub. No.: WO2021/172234
PCT Pub. Date: Sep. 2, 2021

(65) Prior Publication Data
US 2023/0060460 A1    Mar. 2, 2023

(30) Foreign Application Priority Data
Feb. 28, 2020    (JP) ................................. 2020-034466

(51) Int. Cl.
*H01M 50/183*    (2021.01)
*H01M 10/04*    (2006.01)
(Continued)

(52) U.S. Cl.
CPC ..... *H01M 50/183* (2021.01); *H01M 10/0481* (2013.01); *H01M 50/107* (2021.01);
(Continued)

(58) Field of Classification Search
CPC ............. H01M 50/183; H01M 50/187; H01M 50/107; H01M 50/152; H01M 50/533
See application file for complete search history.

(56) References Cited

U.S. PATENT DOCUMENTS 6,251,535 B1 *  6/2001  Yamada .............. H01M 50/271
                                                  429/100
2012/0058390 A1   3/2012  Obayashi et al.
(Continued)

FOREIGN PATENT DOCUMENTS

CN    102386368 A    3/2012
EP        959508 A1   11/1999
(Continued)

OTHER PUBLICATIONS

The EPC Office Action dated Oct. 6, 2023 for the related European Patent Application No. 21761335.5.
(Continued)

*Primary Examiner* — Kenneth J Douyette
(74) *Attorney, Agent, or Firm* — Rimon P.C.

(57) ABSTRACT

A power storage device includes: an electrode group including first and second electrodes; a case accommodating the electrode group therein, the case having an opening; and a sealing body closing the opening of the case. The sealing body includes: an annular sealing plate having a first surface and a second surface opposite to the first surface, the sealing plate having a first through-hole provided therein; a terminal plate having a third surface and a fourth surface opposite to the third surface, the third surface facing the first surface of the sealing plate; and an annular gasket disposed between the sealing plate and the terminal plate, the gasket having a second through-hole overlapping the first through-hole. The sealing plate includes a first recessed portion and an outer peripheral portion connected to a peripheral edge of the first recessed portion, the first recessed portion having a recess in (Continued)

the first surface of the sealing plate and having the first through-hole therein. The terminal plate includes a projecting portion projecting from the third surface toward the sealing plate and a flange portion extended from the projecting portion in a second direction intersecting with a first direction. The projecting portion has an end surface closing the first and second through-holes. The projecting portion of the terminal plate is accommodated in the first recessed portion. A peripheral edge of the outer peripheral portion of the sealing plate is joined with an opening end portion of the case. The first electrode and the second electrode are electrically connected to the terminal plate and the case, respectively.

20 Claims, 6 Drawing Sheets

(51) Int. Cl.
    *H01M 50/107*     (2021.01)
    *H01M 50/152*     (2021.01)
    *H01M 50/533*     (2021.01)
    *H01M 50/543*     (2021.01)

(52) U.S. Cl.
    CPC ....... *H01M 50/152* (2021.01); *H01M 50/533* (2021.01); *H01M 50/543* (2021.01)

(56) References Cited

U.S. PATENT DOCUMENTS

2015/0155532 A1   6/2015   Harayama et al.
2018/0205044 A1   7/2018   Urushihara

FOREIGN PATENT DOCUMENTS

| EP | 1018175 B1 | 3/2005 |
| JP | 2004-241171 | 8/2004 |
| WO | 2018/159180 A1 | 9/2018 |

OTHER PUBLICATIONS

English Translation of Chinese Office Action dated Mar. 1, 2024 for the related Chinese Patent Application No. 202180011297.X.
International Search Report of PCT application No. PCT/JP2021/006494 dated Apr. 27, 2021.

* cited by examiner

POWER STORAGE DEVICE

CROSS-REFERENCE TO RELATED APPLICATIONS

This application is a U.S. national stage application of the PCT International Application No. PCT/JP2021/006494 filed on Feb. 19, 2021, which claims the benefit of foreign priority of Japanese patent application No. 2020-034466 filed on Feb. 28, 2020, the contents all of which are incorporated herein by reference.

TECHNICAL FIELD

The present disclosure relates to a power storage device.

BACKGROUND ART

A power storage device is widely used as a driving source of a vehicle, an electronic device, or the like. Typically, the power storage device includes a case accommodating an electrode group including a first electrode and a second electrode and has an opening, and a sealing body closing the opening of the case. In the case that the first electrode is electrically connected to the case, the second electrode is connected to a terminal portion provided in the sealing body. The terminal portion is insulated electrically from the case.

PTL 1 discloses a nonaqueous electrolyte secondary battery including a battery case with a bottomed tubular shape, a power generation element accommodated in the battery case, and a sealing plate closing an opening of the battery case. The sealing plate includes a flange portion, a boss portion, and a projecting portion. The flange portion is formed so as to substantially coincide with the shape of an opening of the battery case. The boss portion holds a gas discharger configured to break when a pressure inside the battery case reaches a predetermined value. The projecting portion projects to the inside of the boss portion. A cap serving as one electrode terminal, an upper metal thin plate, a lower metal thin plate, and a gasket are disposed between the projecting portion and a bending portion of the boss portion which is formed such that one end of the boss portion is bent inward.

CITATION LIST

Patent Literature

PTL 1: Japanese Patent Laid-Open Publication No. 2004-241171

SUMMARY OF THE INVENTION

Technical Problem

For providing the above-mentioned boss portion and projecting portion on the sealing plate of Patent Literature 1, however, complicated processing is required. For instance, one of the boss portion and the projecting portion is formed on the sealing plate, the other is needed to be formed on the sealing plate by welding or forging. To manufacture such a sealing plate accurately, a high cost is needed. For that reason, the present disclosure aims to provide a power storage device including a sealing body processed easily.

Solution to Problem

An aspect of the present disclosure relates to a power storage device includes an electrode group including a first electrode and a second electrode; a case accommodating the electrode group therein, the case having an opening; and a sealing body closing the opening of the case. The sealing body includes: a sealing plate having a first surface and a second surface opposite to the first surface, the sealing plate having an annular shape having a first through-hole provided therein; a terminal plate having a third surface and a fourth surface opposite to the third surface, the third surface facing the first surface of the sealing plate in a first direction; and a gasket disposed between the sealing plate and the terminal plate, the gasket having an annular shape having a second through-hole provided therein, the second through-hole overlapping the first through-hole. The sealing plate includes a first recessed portion and an outer peripheral portion connected to a peripheral edge of the first recessed portion, the first recessed portion having a recess in the first surface of the sealing plate and having the first through-hole therein. The terminal plate includes a projecting portion projecting from the third surface toward the sealing plate and a flange portion extended from the projecting portion in a second direction intersecting with the first direction, the projecting portion having an end surface closing the first through-hole and the second through-hole. The projecting portion of the terminal plate is accommodated in the first recessed portion of the sealing plate via the gasket. A peripheral edge of the outer peripheral portion of the sealing plate is joined with an opening end portion of the case surrounding the opening of the case. The first electrode is electrically connected to the projecting portion of the terminal plate. The second electrode is electrically connected to the case.

Advantageous Effect of Invention

According to the present disclosure, sealing between the sealing plate and the terminal plate can be performed without the projecting portion. This provides a power storage device including a sealing body formed easily.

DESCRIPTION OF EMBODIMENTS

A power storage device in accordance with one aspect of the present disclosure includes an electrode group including a first electrode and a second electrode, a case accommodating the electrode group and having an opening, and a sealing body closing the opening of the case. The case has a cylindrical shape, for example. The case has, for example, a tubular portion, an opening end portion connected to one end of the tubular portion and corresponding to the opening, a bottom closing the other end of the tubular portion. The case has conductivity. The case is made of metal, for example. The metal constituting the case may be aluminum, copper, iron, stainless steel, nickel, alloy combined by these metals, and the like. In the electrode group, the first electrode and the second electrode are wound via a separator between the electrodes, for example. If the power storage device is a battery, one of the first electrode and the second electrode is a positive electrode, and the other is a negative electrode.

The sealing body includes: a sealing plate with an annular shape having a first surface and a second surface opposite thereto and having a first through-hole therein; a terminal plate having a third surface facing the first surface of the sealing plate in a first direction and a fourth surface opposite to the first surface; and a gasket with an annular shape between the sealing plate and the terminal plate. The gasket has a second through-hole therein. The second through-hole overlaps the first through-hole. The gasket is interposed between the sealing plate and the terminal plate so as to insulate the sealing plate from the terminal plate. The gasket may be made of, e.g., polypropylene (PP), polyphenylene sulfide (PPS), poly butylene terephthalate (PBT), perfluoroalkoxyalkanen (PFA), polyetheretherketone (PEEK). A peripheral edge of an outer peripheral portion of the sealing plate is joined with an opening end portion of the case so as to allow the sealing body to seal the opening of the case. The peripheral edge of the outer peripheral portion of the sealing plate is located away by a sufficient distance from the gasket interposed between the sealing plate and the terminal plate. Therefore, when the peripheral edge of the outer peripheral portion of the sealing plate is joined with the opening end portion of the case by welding, the gasket does not deteriorate due to the heat at the welding.

The sealing plate has conductivity. The sealing plate may be made of metal, for example. The metal constituting the sealing plate may be aluminum, copper, iron, stainless steel, nickel, alloy combined by these metals, and the like. The sealing plate made of the same material as the case enhances the reliability of junction between the sealing plate and the case. The sealing plate further includes a first recessed portion having a recess in the first surface and having the first through-hole therein, and an outer circumferential portion connected to a peripheral edge of the first recessed portion. In other words, the first surface of the sealing plate has an inner bottom surface of the first recessed portion, and an inner circumferential surface of the first recessed portion extended from the inner bottom surface in the first direction. The sealing plate may be formed easily and precisely at a low cost by combining punch processing and press processing easily. A bottom portion of the first recessed portion may be constituted by a thin wall part thinner than the outer circumferential portion.

The terminal plate has conductivity. The terminal plate may be made of metal, for example. The metal constituting the terminal plate may be aluminum, copper, iron, stainless steel, nickel, alloy combined by these metals, and the like. The terminal plate made of the same material as a lead enhances the reliability of junction between the terminal plate and the lead. The terminal plate includes a projecting portion projecting from the third surface toward the sealing plate, and a flange portion extended from the projecting portion in a second direction (or direction perpendicular to the first direction) which is a radial direction of the sealing plate. The projecting portion has an end surface on a third surface side. The end surface of the projecting portion closes the first through-hole and the second through-hole. The terminal plate is formed easily at a low-cost easily and precisely by a combination of punch processing and press processing. The projecting portion may be constituted by a thick part thicker than the flange portion.

The projecting portion of the terminal plate is accommodated in the first recessed portion of the sealing plate via the gasket. In other words, the third surface of the terminal plate includes an end surface of the projecting portion facing the inner bottom surface of the first recessed portion, and an outer circumferential surface of the projecting portion extended from the end surface in the first direction. The peripheral edge of the end surface of the projecting portion faces the inner bottom surface of the first recessed portion of the sealing plate.

The first electrode is electrically connected to the projecting portion of the terminal plate. The second electrode is electrically connected to the case. The sealing plate joined with the case has the same polarity as the second electrode.

The gasket may include a first sealing portion formed around the second through-hole, a second sealing portion with a tubular shape connected to the first sealing portion, and a third sealing portion with an annular shape connected to the second sealing portion. This configuration enhances sealing ability between the sealing plate and the terminal plate. For instance, the first sealing portion is interposed between the end surface of the projecting portion of the terminal plate and the inner bottom surface of the first recessed portion of the sealing plate. The second sealing portion extends from the first sealing portion in the first direction, and is interposed between the inner circumferential surface of the first recessed portion and the outer circumferential surface of the projecting portion. The third sealing portion extends from the second sealing portion in the second direction, and is interposed between the flange portion of the terminal plate and the outer peripheral portion of the sealing plate.

The opening edge of the first through-hole located in the first recessed portion of the sealing plate may include a first hook portion. The first hook portion projects so as to press the first sealing portion of the gasket. For instance, the first hook portion is bent toward the first sealing portion. The first hook portion presses the first sealing portion to increase a coupling strength between the sealing plate and the terminal plate, accordingly increasing airtightness in the case by the sealing body.

The end surface of the terminal plate may have a rib (hereafter, referred to as a first rib) projecting toward the first sealing portion. The first rib may have an annular shape when viewed in the first direction. The first hook portion is engaged with an inner circumferential surface of the first rib, thereby enhancing the coupling strength between the sealing plate and the terminal plate.

A tip end of the first hook portion may be located on an inner side of the case with respect to the first rib in the second direction. This configuration allows the first hook portion to hold the rib via the gasket together with the inner circumferential surface of the first recessed portion. Therefore, the gasket is compressed between the rib and the inner circumferential surface of the first recessed portion and between the first hook portion and the rib, thereby increasing the reliability of sealing between the sealing plate and the terminal plate.

The projecting portion may include a second recessed portion with a recess provided in the third surface. The fourth surface may have a first groove portion surrounding the second recessed portion. The first groove portion may be formed in correspondence to the first rib. For instance, the first groove is formed in the fourth surface to cause the third surface to project to form the first rib.

Dimension D1 of the first groove portion in the second direction at any position P1 may be smaller than dimension D2 of the first groove portion in the second direction at position P2 located closer to the third surface than position P1 is in the first direction. For instance, a dimension of the first groove portion in the second direction at a position farthest from the third surface in the first direction (i.e., in the vicinity of an opening of the first groove portion) may be smaller than a dimension of the first groove portion at a position closer to the third surface (e.g., the deepest portion of the first groove portion, or near the center in a depth direction of the first groove portion) than the farthest position. In this case, a most projecting portion of the first rib has a dimension in the second direction larger than that of a root portion of the first rib in the second direction. This configuration allows the first hook portion to be more tightly engaged with the inner circumferential surface of the first rib.

An inner circumferential edge of the first sealing portion may be bent toward the second recessed portion together with the first hook portion. This configuration increases adhesion between the first hook portion and the first sealing portion, thereby enhancing compressibility of the first sealing portion. Consequently, airtightness in the case by the sealing body is enhanced.

The flange portion of the terminal plate may have a second hook portion pressing the third sealing portion. For instance, the second hook portion is bent toward the third sealing portion. This configuration increases adhesion between the second hook portion and the third sealing portion, thereby improving compressibility of the third sealing portion. Consequently, sealing ability between the outer peripheral portion of the sealing plate and the terminal plate is more improved. The sealing between the terminal plate and the sealing plate of the power storage device of the present disclosure may be performed without the first hook portion or the second hook portion. For instance, a distance between the inner circumferential surface of the first recessed portion and the outer circumferential surface of the projecting portion may be smaller than a thickness of the gasket in the second sealing portion, thereby causing the above-mentioned inner circumferential surface and the above-mentioned outer circumferential surface to compress the second sealing portion. The sealing between the terminal plate and the sealing plate may be performed in this manner.

The second surface of the outer peripheral portion of the sealing plate may have a second groove portion surrounding the first recessed portion. The second groove portion causes the first surface to project to form a second rib. Dimension D3 of the second groove portion in the second direction at any position P3 may be smaller than dimension D4 of the second groove portion in the second direction at position P4 located closer to the first surface than position P3 is in the first direction. For instance, a dimension of the second groove portion in the second direction at a position farthest from the first surface in the first direction (i.e., in the vicinity of an opening of the second groove portion) may be smaller than a dimension of the second groove portion at a position closer to the first surface (e.g., the deepest portion of the second groove portion, or near the center in a depth direction of the second groove portion) than the farthest position. In this case, the most projecting portion of the second rib has a dimension larger than that of a root portion of the second rib in the second direction. Thus, the second hook portion can be more tightly engaged with an outer circumferential surface of the second rib via the gasket.

Although not limited in particular, a primary cell, a rechargeable battery, a lithium ion capacitor, an electric double layer capacitor, a solid electrolytic capacitor, and the like are listed as a type of the power storage device. Especially, a nonaqueous electrolyte secondary battery (solid state batteries all are included), such as a rechargeable lithium-ion battery with high energy density, can be used suitably.

Hereinafter, a power storage device in accordance with an exemplary embodiment of the present invention will be described with reference to the drawings. The present invention, however, is not limited to the following.

Figure 1:
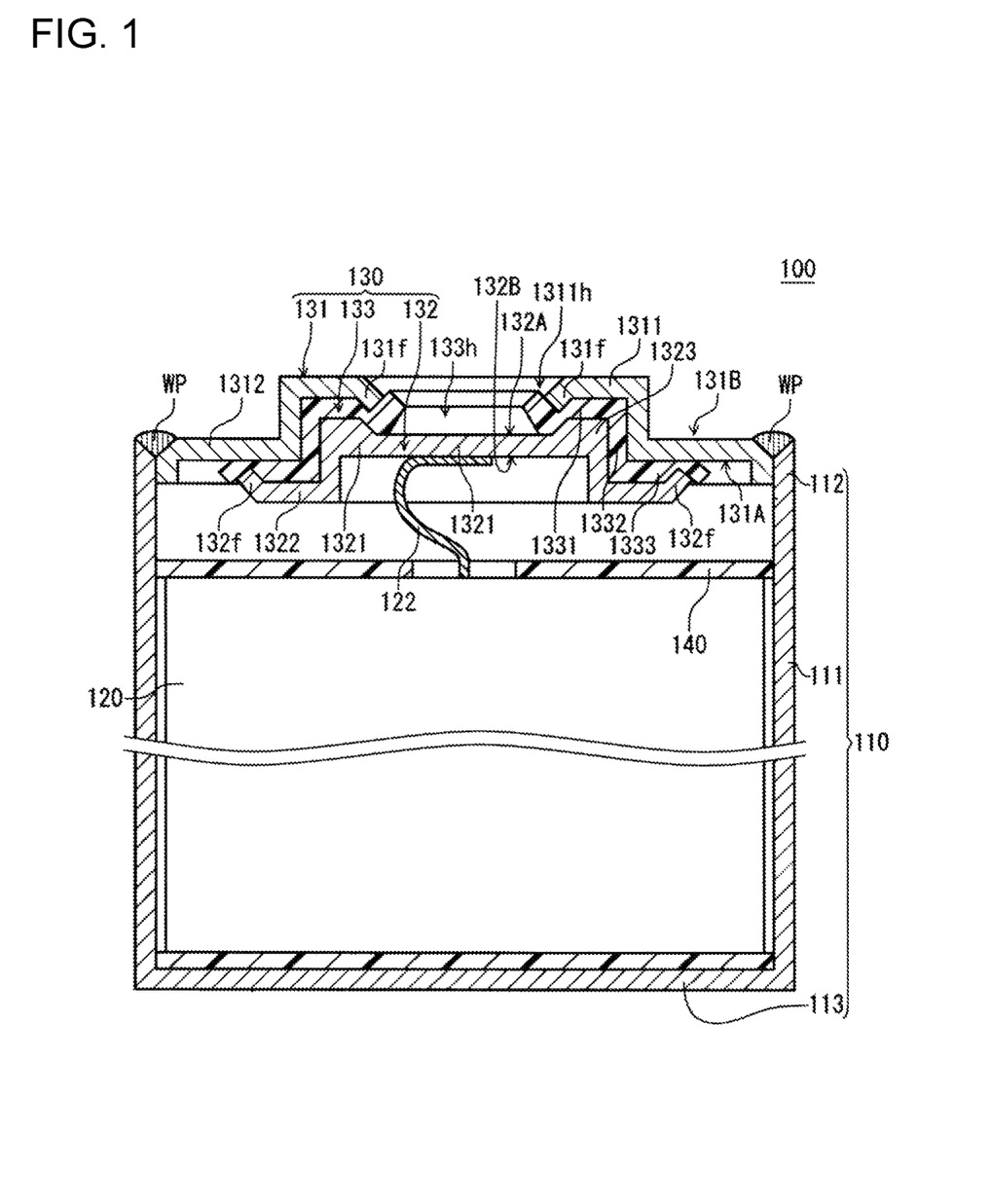
FIG. 1 is a cross-sectional view of an example of a power storage device in accordance with one exemplarily embodiment of the present disclosure.
Figure 2:
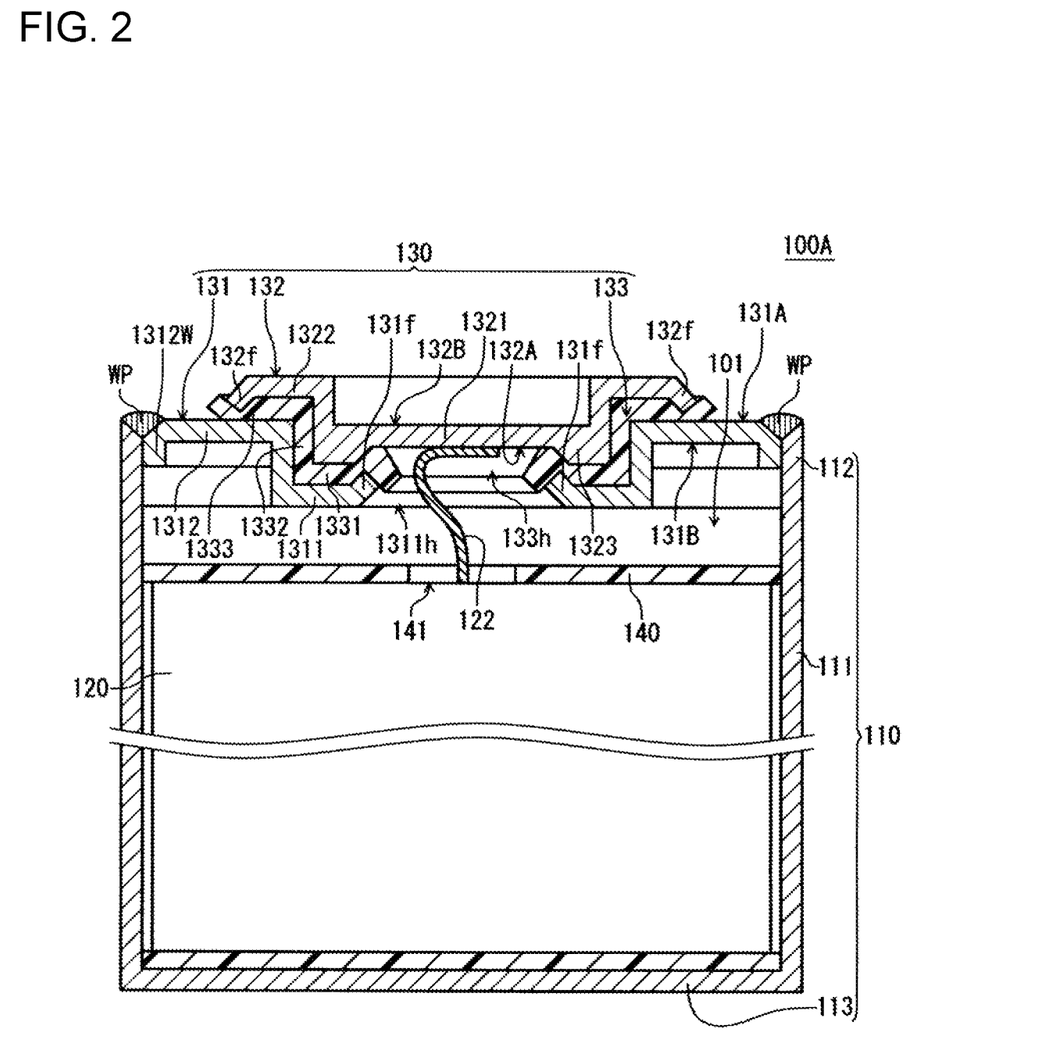
FIG. 2 is a cross-sectional view of a modification of the power storage device in accordance with the exemplarily embodiment of the present disclosure.

FIG. 1 is a cross-sectional view an example of power storage device 100 in accordance with one exemplary embodiment for illustrating a structure thereof. FIG. 2 is a cross-sectional view of power storage device 100A in accordance with a modification of power storage device 100. Power storage device 100 includes case 110 with a cylindrical shape having opening 101, electrode group 120 including a first electrode and a second electrode accommodated in case 110, and sealing body 130 sealing opening 101.

Sealing body 130 includes sealing plate 131, terminal plate 132, and insulating gasket 133 that is interposed between sealing plate 131 and terminal plate 132. Case 110 includes tubular portion 111 with a cylindrical shape, opening end portion 112 connected to one end of tubular portion 111 and corresponds to opening 101, and bottom 113 closing the other end of tubular portion 111.

Sealing plate 131 has first surface 131A and second surface 131B opposite to the first surface. Sealing plate 131 has an annular shape. Sealing plate 131 includes first recessed portion 1311 with an inner flange shape in which first surface 131A is recessed inwardly, and has outer peripheral portion 1312 around first recessed portion 1311.

First recessed portion 1311 has first through-hole 1311h therein at the center portion thereof. A region of first surface 131A corresponding to first recessed portion 1311 has an inner bottom surface of the first recessed portion and an inner circumferential surface extended from the inner bottom surface in a first direction. Herein, the first direction is axial direction Da of annular sealing plate 131.

A peripheral edge of outer peripheral portion 1312 is joined with opening end portion 112 of case 110 at welding portion WP. In other words, sealing plate 131 is electrically connected to case 110. Since case 110 is connected to the second electrode, sealing plate 131 is electrically connected to the second electrode. Shallow tubular wall 1312W extended inside the case is formed on the peripheral edge of outer peripheral portion 1312 to enlarge a dimension of a welding mark in axial direction Da (i.e., depth of a welding mark) between sealing body 130 and opening end portion 112 of the case. This configuration increases strength of the welding mark, and enhances the reliability of sealing between the sealing body and the case.

Terminal plate 132 has third surface 132A facing first surface 131A of sealing plate 131 in the first direction, and fourth surface 132B opposite to third surface 132A. Third surface 132A has an end surface of projecting portion 1321 facing an inner bottom surface of first recessed portion 1311 of sealing plate 131, and an outer circumferential surface of projecting portion 1321 extended from the end surface of projecting portion 1321 in the first direction.

Terminal plate 132 includes projecting portion 1321 projecting from third surface 132A toward sealing plate 131, and flange portion 1322 extended from projecting portion 1321 in second direction Dr which is a radial direction of the sealing plate. Second direction Dr perpendicular to first direction Da. The first electrode is electrically connected to projecting portion 1321 of terminal plate 132.

Gasket 133 with an annular shape is provided between sealing plate 131 and terminal plate 132, and has second through-hole 133h therein at the center part thereof. Projecting portion 1321 of terminal plate 132 is accommodated in first recessed portion 1311 of sealing plate 131 via gasket 133. Second through-hole 133h of gasket 133 may concentrically overlap first through-hole 1311h of the sealing plate.

Gasket 133 includes first sealing portion 1331 provided around second through-hole 133h, second sealing portion 1332 with a tubular shape, and third sealing portion 1333 with an annular shape. First sealing portion 1331 is interposed between the end surface of projecting portion 1321 of terminal plate 132 and the inner bottom surface of first recessed portion 1311 of sealing plate 131. Second sealing portion 1332 with the tubular shape is extended from first sealing portion 1331 in first direction Da and is interposed between the outer circumferential surface of projecting portion 1321 of terminal plate 132 and the inner circumferential surface of first recessed portion 1311 of sealing plate 131. Third sealing portion with the annular shape is extended from second sealing portion 1332 in second direction Dr and is interposed between flange portion 1322 of terminal plate 132 and outer peripheral portion 1312 of sealing plate 131.

First hook portion 131f is provided at the opening edge of first through-hole 1311h of first recessed portion 1311. First hook portion 131f is bent toward gasket 133 to press first sealing portion 1331 of gasket 133. First rib 1323 projecting toward first sealing portion 1331 is formed on the end surface of projecting portion 1321 of terminal plate 132. First hook portion 131f is engaged with first rib 1323 via first sealing portion 1331, thereby sealing second through-hole 133h while integrating sealing plate 131 with terminal plate 132. In other words, sealing plate 131 is crimped to third surface 132A of terminal plate 132 via third sealing portion 1333 with first hook portion 131f.

A tip end of first hook portion 131f is located on an inner side of the case with respect to first rib 1323 when viewed in first direction Da. This configuration allows first hook portion 131f to hold first rib 1323 via gasket 133 together with the inner circumferential surface of first recessed portion 1311. Therefore, gasket 133 is compressed between the inner circumferential surface of first recessed portion 1311 and the first rib 1323 and between first hook portion 131f and first rib 1323, thereby increasing the reliability of sealing between sealing plate 131 and terminal plate 132.

Second hook portion 132f is formed on flange portion 1322 of terminal plate 132 to press third sealing portion 1333 of gasket 133. In other words, terminal plate 132 is crimped to first surface 131A of sealing plate 131 via third sealing portion 1333 with second hook portion 132f.

Internal insulating plate 140 is disposed between electrode group 120 and sealing body 130 to prevent electrode group 120 from contact sealing body 130 or case 110. Predetermined lead hole 141 is formed in internal insulating plate 140. Lead 122 is drawn from the first electrode constituting electrode group 120 passes through lead hole 141, and is electrically connected to an inner surface of terminal plate 132. Consequently, terminal plate 132 has the same polarity as the first electrode. On the other hand, the second electrode constituting electrode group 120 is electrically connected to case 110. Therefore, case 110 has the same polarity as the second electrode.

As shown in FIG. 1, in the above-mentioned configuration, second surface 131B of outer peripheral portion 1312 of sealing plate 131 and end surface (third surface 132A) of projecting portion 1321 of terminal plate 132 may be placed to have substantially the same height in first direction Da. Accordingly, when an external current collecting lead is connected to each of sealing plate 131 and terminal plate 132, connection at substantially the same height can be achieved.

Power storage device 100A in accordance with a modification of FIG. 2 includes a sealing body with fundamentally the same structure as power storage device 100 in FIG. 1, but a direction in which the sealing body is fixed to opening 101 of case 110 is reversed. In the case of FIG. 1, first recessed portion 1311 of sealing plate 131 projects toward the outside of case 110 in first direction Da, and therefore the height of the power storage device is enlarged by the above-mentioned projection. On the other hand, in the device shown in FIG. 2, first recessed portion 1311 of sealing plate 131 projects toward the inside of case 110 in first direction Da, thereby preventing the height of the power storage device from being enlarged.

In FIG. 1, however, an internal pressure inside the case is applied in a direction allowing sealing plate 131 to be pressed upward from terminal plate 132 via gasket 133. Therefore, airtightness by sealing body 130 is relatively increased.

In the modification of FIG. 2, first surface 131A of outer peripheral portion 1312 of sealing plate 131 and fourth surface 132B of projecting portion 1321 of terminal plate 132 may be placed to have substantially the same height in first direction Da.

Figure 3A:
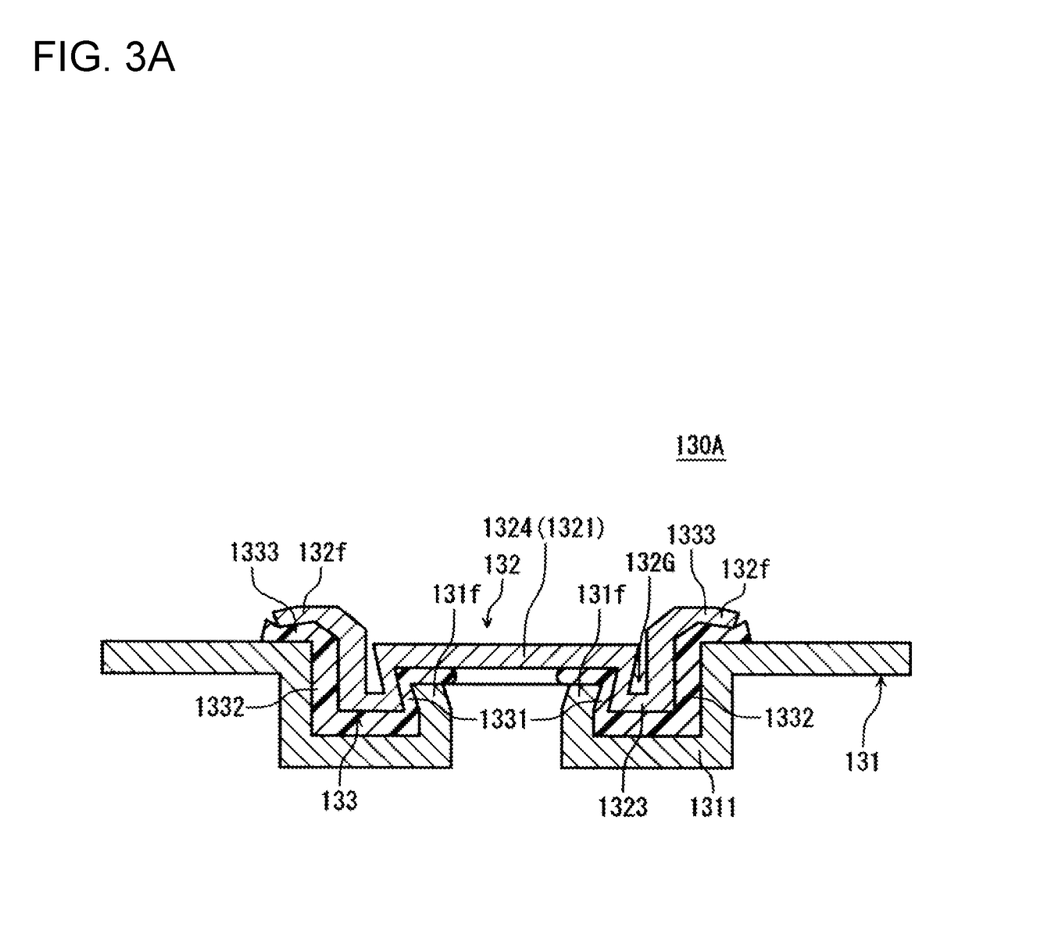
FIG. 3A is a cross-sectional view of a modification of a sealing body in accordance with the exemplarily embodiment of the present disclosure.

FIG. 3A is a cross-sectional view of sealing body 130A in accordance with a modification of sealing body 130. Second recessed portion 1324 having a recess in third surface 132A is formed in projecting portion 1321 of terminal plate 132. First groove portion 132G is formed in fourth surface 132B of terminal plate 132 to surround second recessed portion 1324. Second recessed portion 1324 and first groove portion 132G are formed in this manner. When first sealing portion 1331 is pressed by first hook portion 131f of sealing plate 131, an inner peripheral edge of first sealing portion 1331 is bent toward second recessed portion 1324 together with first hook portion 131f, and an inner circumferential surface of first rib 1323 is inclined outwardly in second direction Dr. Thus, first hook portion 131f is engaged with rib 1323 more tightly via gasket 133, so that terminal plate 132 is strongly fixed to sealing plate 131.

In FIG. 3A, a dimension of the first groove portion 132G in second direction Dr has the smallest value at the vicinity of an opening of first groove portion 132G which is farthest from first recessed portion 1311 in first direction Da, and has the largest value at the deepest portion of first groove portion 132G which is closest to first recessed portion 1311, but not limited to this. For instance, the dimension of the first groove portion 132G in second direction Dr may have the maximum value in the vicinity of the center of first groove portion 132G in a depth direction.

Figure 3B:
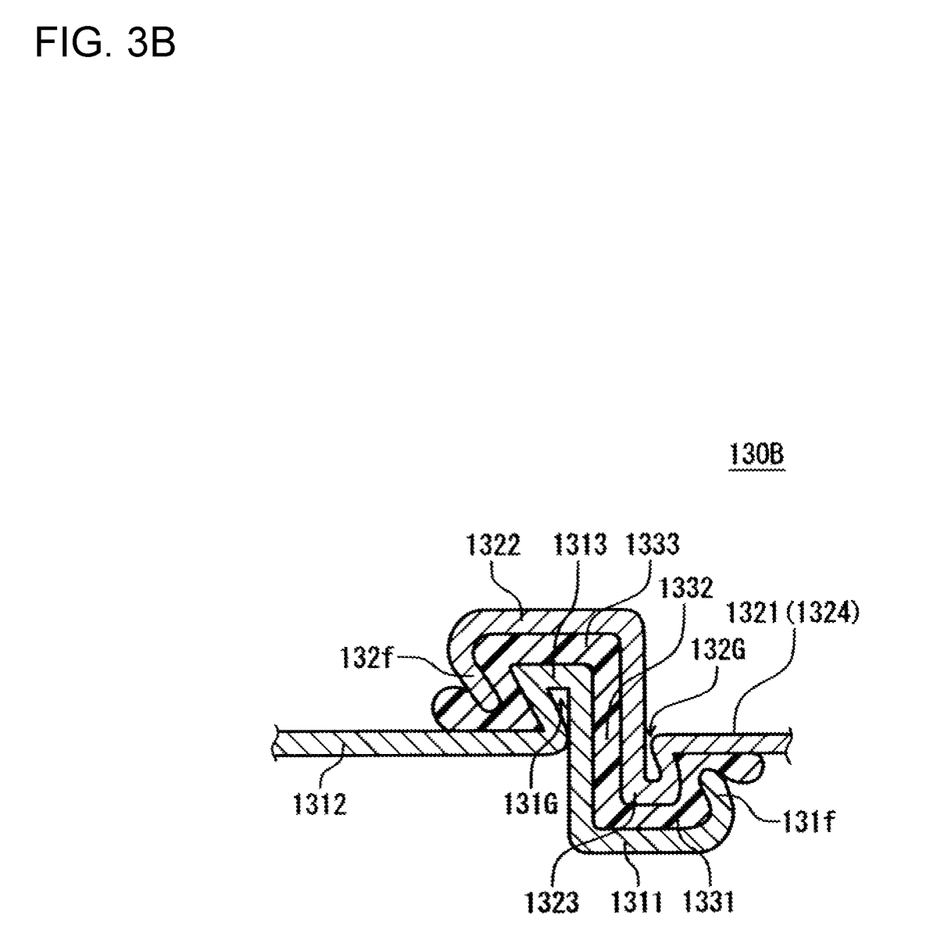
FIG. 3B is a cross-sectional view of a main part of another modification of the sealing body in accordance with the exemplarily embodiment of the present disclosure.

FIG. 3B is a cross-sectional view of a main part of sealing body 130B in accordance with another modification of sealing body 130. Second surface 131B of outer peripheral portion 1312 of sealing plate 131 has second groove portion 131G surrounding first recessed portion 1311. Further, first surface 131A projects to have second rib 1313 corresponding to second groove portion 131G. On the other hand, similarly to FIG. 3A, second recessed portion 1324 with a recess in third surface 132A is formed in projecting portion 1321 of terminal plate 132. First groove portion 132G surrounding second recessed portion 1324 is formed in fourth surface 132B.

First groove portion 132G (first rib 1323) and second groove portion 131G (second rib 1313) are formed in this manner. As a result, first sealing portion 1331 is pressed by first hook portion 131f of sealing plate 131, and third sealing portion 1333 is pressed by second hook portion 132f of the terminal plate 132, thereby fixing sealing plate 131 and terminal plate 132 more tightly.

A structure of the sealing body is not limited to the examples shown in FIGS. 1 to 3, but may be modified variously. Hereinafter, a modification of the sealing body will be described with reference to the drawing, but the modification is not limited to the following.

Figure 4:
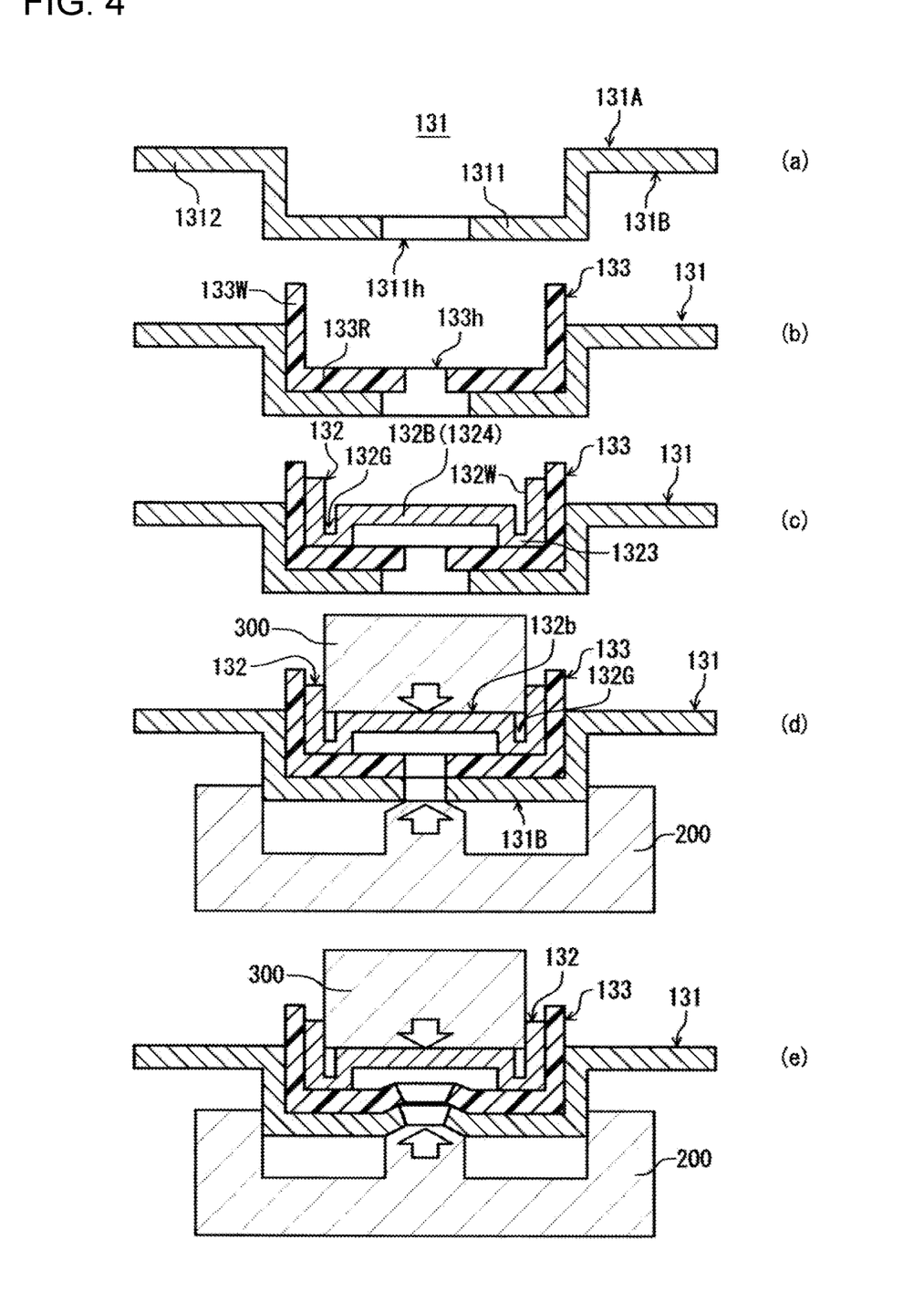
FIG. 4 is a process chart showing a manufacturing process (first half) of the sealing body in accordance with one exemplarily embodiment of the present disclosure.
Figure 5:
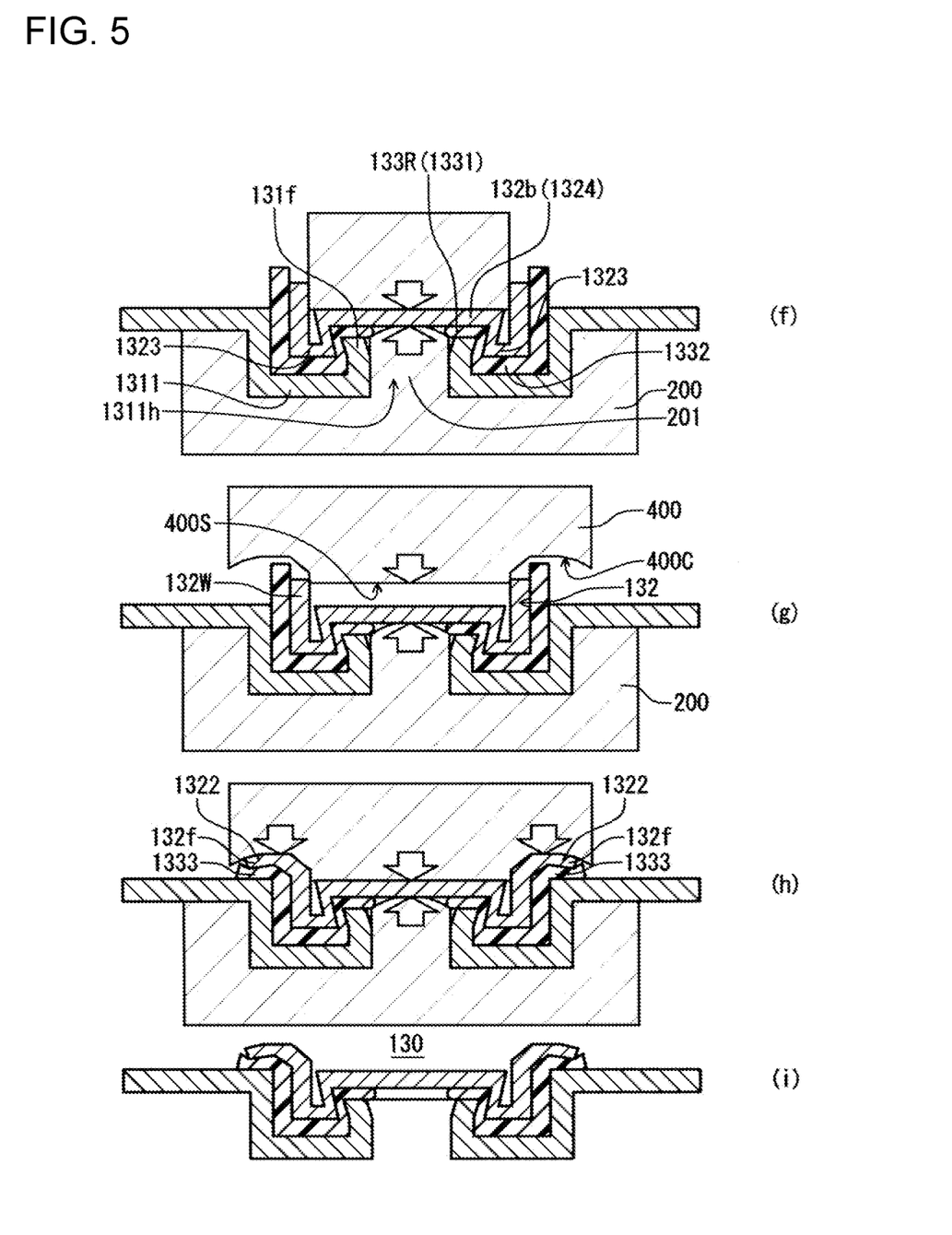
FIG. 5 is a process chart showing a manufacturing process (latter half) of the sealing body in accordance with one exemplarily embodiment of the present disclosure.

Next, a method of manufacturing sealing body 130A in accordance with the present exemplary embodiment will be described exemplarily below. FIG. 4 is a process chart showing a first half of the manufacturing process of sealing body 130A. FIG. 5 is a process chart showing a latter half of the manufacturing process of sealing body 130A.

First, sealing plate 131 is prepared (FIG. 4(a)). Annular sealing plate 131 has first surface 131A and second surface 131B opposite to each other. Sealing plate 131 has first recessed portion 1311 with a recess in first surface 131A falling inwardly, and outer peripheral portion 1312 around first recessed portion 1311. First through-hole 1311h is provided in a center portion of first recessed portion 1311.

Next, gasket 133 is inserted into first recessed portion 1311 of sealing plate 131 to be engaged with first recessed portion 1311 (FIG. 4(b)). Gasket 133 with an annular shape includes tubular wall 133W constituting the second sealing portion and the third sealing portion constituted later, and annular base 133R with an inner flange shape constituting the first sealing portion later. Second through-hole 133h is provided in a center portion of annular base 133R. When sealing plate 131 is engaged with gasket 133, first through-hole 1311h and second through-hole 133h are arranged concentrically.

Next, terminal plate 132 is inserted into the inside of cylindrical wall 133W of gasket 133, and both are engaged with each other (FIG. 4(c)). Terminal plate 132 with a disc shape includes tubular wall 132W constituting flange portion 1322 later, and bottom 132b closing one end of tubular wall 132W. Bottom 132b constitutes the projecting portion projecting in first direction Da when viewed from flange portion 1322. First rib 1323 with an annular shape is formed on a peripheral edge of bottom 132b. First rib 1323 projects toward annular base 133R of gasket 133. A circular region of the gasket surrounded by first rib 1323 constitutes second recessed portion 1324 with a recess provided in third surface 132A. A back side of first rib 1323 constitutes first groove portion 132G.

Next, first metallic mold 200 having a surface having a recess with a ring shape contacts second surface 131B of sealing plate 131. Second metallic mold 300 for punching contacts fourth surface 132B of terminal plate 132 to press second recessed portion 1324. After that, pressure is applied in a direction (first direction Da) such that sealing plate 131 and terminal plate 132 approach each other (FIGS. 4(d) and 4(e)).

Pressure is further applied in the direction (first direction Da) to cause sealing plate 131 and terminal plate 132 to approach each other such that projecting portion 201 which is arranged in the center of a surface of first metallic mold 200 with a recess with a ring shape contacts terminal plate 132 (FIG. 5(f)). At this moment, a peripheral edge of first through-hole 1311h in first recessed portion 1311 of sealing plate 131 is bent to form first hook portion 131f. Simultaneously, first hook portion 131f is crimped to bottom 132b (second recessed portion 1324 of the projecting portion) of terminal plate 132 via annular base 133R of gasket 133. Further, first sealing portion 1331 and second sealing portion 1332 of gasket 133 are formed. Furthermore, first hook portion 131f presses an inner circumferential surface of first rib 1323 outwardly in second direction Dr via first sealing portion 1331, so that the inner circumferential surface of rib 1323 is inclined.

Next, second metallic mold 300 is replaced with third metallic mold 400 serving as another metallic mold. Third metallic mold 400 has flat surface 400S in the center of a contact surface with terminal plate 132. Third metallic mold 400 further has smooth recessed surface 400C, which is to contact cylindrical wall 132W, around flat surface 400S. When recessed surface 400C, mentioned above, of third metallic mold 400 is pressed on tubular wall 132W of terminal plate 132, tubular wall 132W is bent to have a flange shape, thereby forming flange portion 1322. At this moment, third sealing portion 1333 of the gasket is formed. Simultaneously, second hook portion 132f is formed on a peripheral portion of flange portion 1322 (a FIGS. 5(g) and 5(h)). As a result, sealing body 130 is formed completely (FIG. 5(i)).

In the above description, a cylindrical type of power storage device has been described as an example, but the present disclosure is also applicable for power storage devices with various kinds of shapes (e.g., a rectangular shape).

INDUSTRIAL APPLICABILITY

A power storage device in accordance with the present disclosure is suitable for being used as a power source of vehicles such as a hybrid vehicle and an electric vehicle.

REFERENCE MARKS IN THE DRAWINGS 100 power storage device
101 opening
110 case
111 tubular portion
112 opening end portion
113 bottom
120 electrode group
122 lead
130 sealing body
131 sealing plate
131A first surface
131B second surface
131f first hook portion
131G second groove portion
1311 first recessed portion
1311h first through-hole
1312 outer peripheral portion
1312W cylindrical wall
1313 second rib
132 terminal plate
132A third surface
132B fourth surface
132b bottom
132f second hook portion 132G first groove portion
132W cylindrical wall
1321 projecting portion
1322 flange portion
1323 first rib
1324 second recessed portion
133 gasket
133h second through-hole
133R annular base
133W cylindrical wall
1331 first sealing portion
1332 second sealing portion
1333 third sealing portion
140 internal insulating plate
141 lead hole
200 first metallic mold
201 projecting portion
300 second metallic mold
400 third metallic mold
400S flat surface
400C recessed surface

The invention claimed is:

1. A power storage device comprising:
an electrode group including a first electrode and a second electrode;
a case accommodating the electrode group therein, the case having an opening; and
a sealing body closing the opening of the case, wherein the sealing body includes:
  a sealing plate having a first surface and a second surface opposite to the first surface, the sealing plate having an annular shape having a first through-hole provided therein;
  a terminal plate having a third surface and a fourth surface opposite to the third surface, the third surface facing the first surface of the sealing plate in a first direction; and
  a gasket disposed between the sealing plate and the terminal plate, the gasket having an annular shape having a second through-hole provided therein, the second through-hole overlapping the first through-hole,
the sealing plate includes a first recessed portion and an outer peripheral portion connected to a peripheral edge of the first recessed portion, the first recessed portion having a recess in the first surface of the sealing plate and having the first through-hole provided therein,
the terminal plate includes a projecting portion projecting from the third surface toward the sealing plate and a flange portion extended from the projecting portion in a second direction intersecting with the first direction, the projecting portion having an end surface closing the first through-hole and the second through-hole,
the projecting portion of the terminal plate is accommodated in the first recessed portion of the sealing plate via the gasket,
a peripheral edge of the outer peripheral portion of the sealing plate is joined with an opening end portion of the case surrounding the opening of the case,
the first electrode is electrically connected to the projecting portion of the terminal plate at a first part of the third face,
the second electrode is electrically connected to the case, and
the third face includes a second part disposed closer to the electrode group than the first part.

2. The power storage device according to claim 1, wherein
the first surface of the sealing plate includes an inner bottom surface of the first recessed portion and an inner circumferential surface of the first recessed portion extended from the inner bottom surface in the first direction,
the third surface of the terminal plate has an end surface of the projecting portion facing the inner bottom surface and an outer circumferential surface extended from the end surface of the projecting portion in the first direction, and
the gasket includes:
  a first sealing portion provided around the second through-hole and between the end surface and the inner bottom surface;
  a second sealing portion provided between the inner circumferential surface of the first recessed portion and the outer circumferential surface of the terminal plate, the second sealing portion having a tubular shape extended from the first sealing portion in the first direction; and
  a third sealing portion extended from the second sealing portion in the second direction and provided between the flange portion and the outer peripheral portion, the third sealing portion having an annular shape.

3. The power storage device according to claim 1, wherein:
an opening edge of the first through-hole of the first recessed portion includes a first hook portion projecting so as to press the first sealing portion of the gasket, and
the end surface of the terminal plate includes a rib projecting toward the first sealing portion.

4. The power storage device according to claim 3, wherein:
a tip end of the first hook portion is located in an inner side of the case with respect to the rib in the second direction, and
the projecting portion includes a second recessed portion having a recess in the third surface and a first groove portion provided in the fourth surface, the first groove portion surrounding the second recessed portion.

5. The power storage device according to claim 4, wherein a dimension D1 of the first groove portion at a position P1 in the second direction is smaller than a dimension D2 of the first groove portion at a position P2 which is closer to the third surface than the position P1 in the first direction.

6. The power storage device according to claim 4, wherein an inner circumferential edge of the first sealing portion is bent toward the second recessed portion together with the first hook portion.

7. The power storage device according to claim 1, wherein:
the flange portion of the terminal plate includes a second hook portion pressing the third sealing portion, and
the second surface of the outer peripheral portion includes a second groove portion surrounding the first recessed portion.

8. A power storage device comprising:
an electrode group including a first electrode and a second electrode;
a case accommodating the electrode group therein, the case having an opening; and a sealing body closing the opening of the case, wherein:
the sealing body includes:
- a sealing plate having a first surface and a second surface opposite to the first surface, the sealing plate having an annular shape having a first through-hole provided therein;
- a terminal plate having a third surface and a fourth surface opposite to the third surface, the third surface facing the first surface of the sealing plate in a first direction; and
- a gasket disposed between the sealing plate and the terminal plate, the gasket having an annular shape having a second through-hole provided therein, the second through-hole overlapping the first through-hole, the sealing plate includes a first recessed portion and an outer peripheral portion connected to a peripheral edge of the first recessed portion, the first recessed portion having a recess in the first surface of the sealing plate and having the first through-hole provided therein, the terminal plate includes a projecting portion projecting from the third surface toward the sealing plate and a flange portion extended from the projecting portion in a second direction intersecting with the first direction, the projecting portion having an end surface closing the first through-hole and the second through-hole, the projecting portion of the terminal plate is accommodated in the first recessed portion of the sealing plate via the gasket, a peripheral edge of the outer peripheral portion of the sealing plate is joined with an opening end portion of the case surrounding the opening of the case, the first electrode is electrically connected to the projecting portion of the terminal plate, the second electrode is electrically connected to the case, and an entirety of the terminal plate is disposed inside a space formed between the sealing plate and the electrode group.

9. The power storage device according to claim 8, wherein:
the first surface of the sealing plate includes an inner bottom surface of the first recessed portion and an inner circumferential surface of the first recessed portion extended from the inner bottom surface in the first direction, the third surface of the terminal plate has an end surface of the projecting portion facing the inner bottom surface and an outer circumferential surface extended from the end surface of the projecting portion in the first direction, and the gasket includes:
- a first sealing portion provided around the second through-hole and between the end surface and the inner bottom surface;
- a second sealing portion provided between the inner circumferential surface of the first recessed portion and the outer circumferential surface of the terminal plate, the second sealing portion having a tubular shape extended from the first sealing portion in the first direction; and
- a third sealing portion extended from the second sealing portion in the second direction and provided between the flange portion and the outer peripheral portion, the third sealing portion having an annular shape.

10. The power storage device according to claim 8, wherein:
an opening edge of the first through-hole of the first recessed portion includes a first hook portion projecting so as to press the first sealing portion of the gasket, and
the end surface of the terminal plate includes a rib projecting toward the first sealing portion.

11. The power storage device according to claim 10, wherein:
a tip end of the first hook portion is located in an inner side of the case with respect to the rib in the second direction, and
the projecting portion includes a second recessed portion having a recess in the third surface and a first groove portion provided in the fourth surface, the first groove portion surrounding the second recessed portion.

12. The power storage device according to claim 11, wherein a dimension D1 of the first groove portion at a position P1 in the second direction is smaller than a dimension D2 of the first groove portion at a position P2 which is closer to the third surface than the position P1 in the first direction.

13. The power storage device according to claim 11, wherein an inner circumferential edge of the first sealing portion is bent toward the second recessed portion together with the first hook portion.

14. The power storage device according to claim 8, wherein:
the flange portion of the terminal plate includes a second hook portion pressing the third sealing portion, and
the second surface of the outer peripheral portion includes a second groove portion surrounding the first recessed portion.

15. A power storage device comprising:
an electrode group including a first electrode and a second electrode;
a case accommodating the electrode group therein, the case having an opening; and
a sealing body closing the opening of the case, wherein:
the sealing body includes:
- a sealing plate having a first surface and a second surface opposite to the first surface, the sealing plate having an annular shape having a first through-hole provided therein;
- a terminal plate having a third surface and a fourth surface opposite to the third surface, the third surface facing the first surface of the sealing plate in a first direction; and
- a gasket disposed between the sealing plate and the terminal plate, the gasket having an annular shape having a second through-hole provided therein, the second through-hole overlapping the first through-hole, the sealing plate includes a first recessed portion and an outer peripheral portion connected to a peripheral edge of the first recessed portion, the first recessed portion having a recess in the first surface of the sealing plate and having the first through-hole provided therein, the terminal plate includes a projecting portion projecting from the third surface toward the sealing plate and a flange portion extended from the projecting portion in a second direction intersecting with the first direction, the projecting portion having an end surface closing the first through-hole and the second through-hole, the projecting portion of the terminal plate is accommodated in the first recessed portion of the sealing plate via the gasket, a peripheral edge of the outer peripheral portion of the sealing plate is joined with an opening end portion of the case surrounding the opening of the case, the first electrode is electrically connected to the projecting portion of the terminal plate, the second electrode is electrically connected to the case, an opening edge of the first through-hole of the first recessed portion includes a first hook portion projecting so as to press the first sealing portion of the gasket, the end surface of the terminal plate includes a rib projecting toward the first sealing portion, and a tip end of the first hook portion is located in an inner side of the case with respect to the rib in the second direction.

16. The power storage device according to claim 15, wherein:

the first surface of the sealing plate includes an inner bottom surface of the first recessed portion and an inner circumferential surface of the first recessed portion extended from the inner bottom surface in the first direction, the third surface of the terminal plate has an end surface of the projecting portion facing the inner bottom surface and an outer circumferential surface extended from the end surface of the projecting portion in the first direction, and the gasket includes:
- a first sealing portion provided around the second through-hole and between the end surface and the inner bottom surface;
- a second sealing portion provided between the inner circumferential surface of the first recessed portion and the outer circumferential surface of the terminal plate, the second sealing portion having a tubular shape extended from the first sealing portion in the first direction; and
- a third sealing portion extended from the second sealing portion in the second direction and provided between the flange portion and the outer peripheral portion, the third sealing portion having an annular shape.

17. The power storage device according to claim 15, wherein the projecting portion includes a second recessed portion having a recess in the third surface and a first groove portion provided in the fourth surface, the first groove portion surrounding the second recessed portion.

18. The power storage device according to claim 17, wherein a dimension D1 of the first groove portion at a position P1 in the second direction is smaller than a dimension D2 of the first groove portion at a position P2 which is closer to the third surface than the position P1 in the first direction.

19. The power storage device according to claim 17, wherein an inner circumferential edge of the first sealing portion is bent toward the second recessed portion together with the first hook portion.

20. The power storage device according to claim 15, wherein:

the flange portion of the terminal plate includes a second hook portion pressing the third sealing portion, and the second surface of the outer peripheral portion includes a second groove portion surrounding the first recessed portion.

* * * * *